United States Patent Office 3,524,769
Patented Aug. 18, 1970

1

3,524,769
METHOD AND APPARATUS FOR INTERRUPTING SHORT-CIRCUIT CURRENTS IN FUEL-CELL BATTERIES
Ferdinand V. Sturm, Erlangen-Buchenbach, and Herbert Nischik and Manfredo Marchetto, Erlangen, Germany, assignors to Siemens Aktiengesellschaft, a corporation of Germany
Filed June 28, 1968, Ser. No. 740,928
Claims priority, application Germany, June 30, 1967, S 110,593
Int. Cl. H01m 27/02, 7/00
U.S. Cl. 136—86                                19 Claims

ABSTRACT OF THE DISCLOSURE

Mehod and apparatus for interrupting short-circuit current in fuel-cell batteries wherein the cells are electrically connected in series and have electrolyte flow paths connected in parallel includes pumping electrolyte from a supply vessel to a leveling tank, thereafter conducting it discontinually to a distributor having a plurality of chambers connected respectively with electrolyte chambers in each fuel cell and then returning it through the battery electrolyte chambers and a collector vessel to the supply vessel. When being conducted, the electrolyte is in continuous communication in the distributor and in the collector vessel between the individual fuel cells of the battery but, when not being conducted, is separated into discontinuous quantities due to discharge of electrolyte.

Our invention relates to method for interrupting the short-circuit currents in fuel cell batteries having two or more fuel cells connected electrically in series and traversed by electrolyte in parallel, as well as device for carrying out the foregoing method.

In the heretofore known systems of this general type, the electrolyte as a rule is circulated by means of a pump the electrolyte chambers of all of the fuel-cell elements being arranged in a single circulatory path for reasons of expediency. The result thereof is that all of the fuel cells are connected to one another through the electrolyte so that undesired short-circuit currents are produced through the outer electrolyte ducts. As a consequence thereof, the efficiency of transforming chemical to electrical energy is sharply reduced, which manifests itself in loss of energy and, in some cases, also in undesired formation of gas at the electrodes due to the occurrence of electrolysis.

It has therefore been proposed in order to reduce the short-circuit current in the electrolyte, to inject gas periodically into the electrolyte traversing the circulatory path before entry of the electrolyte into the fuel cell, and thereby increase the electrical resistance in the electrolyte duct.

It has been further suggested to provide valves in the electrolyte ducts of fuel-cell batteries, the valves being closed when the electrolyte is not traversing its circulatory path. In this manner then, the short-circuit currents produced in the time periods when no electrolyte circulation occurs will be sharply reduced.

It has been found, however, that although the conductive connections between the fuel cells can be markedly interrupted, i.e. the short-circuiting currents can be reduced, during the rest periods in the discontinuous or periodic circulation of the electrolyte produced by automatically closing one-way valves such as flap, ball and lip valves, the short-circuit currents cannot, however, be completely eliminated in this manner.

In fuel-cell batteries which are provided as stand-by energizing sources and remain without load in ready-to-use condition for a long period of time, such reduced short-circuit currents can still be too high. The same also applies to fuel-cell batteries which must be operated maintenance-free for long periods of time with small loads.

Further disadvantages of the automatically closing check valves are that their function or operation can be easily disturbed during the period in which the electrolyte circulates through the circulatory path, and the regulation of the periodic circulation of the electrolyte cannot be accomplished without expenditure or waste of energy.

It is accordingly an object of our invention to provide method and apparatus for interrupting the short-circuit currents in fuel-cell batteries having two or more fuel cells connected electrically in series and traversible in parallel by electrolyte containing one or more reactants, which avoids the aforementioned disadvantages of the heretofore known methods and apparatus of this general type by not employing any movable mechanical parts.

With the foregoing and other objects in view, we provide a method in accordance with the invention which comprises pumping the electrolyte continually or discontinually from a supply vessel into a leveling tank, conducting the electrolyte from the leveling tank discontinually into a distributor or manifold connected separately through separation chambers with the electrolyte chambers respectively of each one of the fuel cells of a battery, and returning the electrolyte through a collector vessel to the supply vessel after the electrolyte has traversed the electrolyte chambers of the individual fuel cells of the battery, preferably in an upward direction, whereby the continuous communication of the electrolyte during the circulation thereof in the distributor and collector vessel between the individual fuel cells of the battery is broken or interrupted by the discharge of the electrolyte into the supply vessel after termination of the period during which the electrolyte circulates through the system.

Other features which are considered as characteristic for the invention are set forth in the appended claims.

Although the invention is illustrated and described herein as method and apparatus for interrupting the short-circuit currents in fuel-cell batteries, it is nevertheless not intended to be limited to the details shown, since various modifications may be made therein without departing from the spirit of the invention and within the scope and range of equivalents of the claims.

The invention, however, together with additional objects and advantages thereof, will be best understood from the following description when read in connection with the accompanying drawings, wherein.

Figure 1:
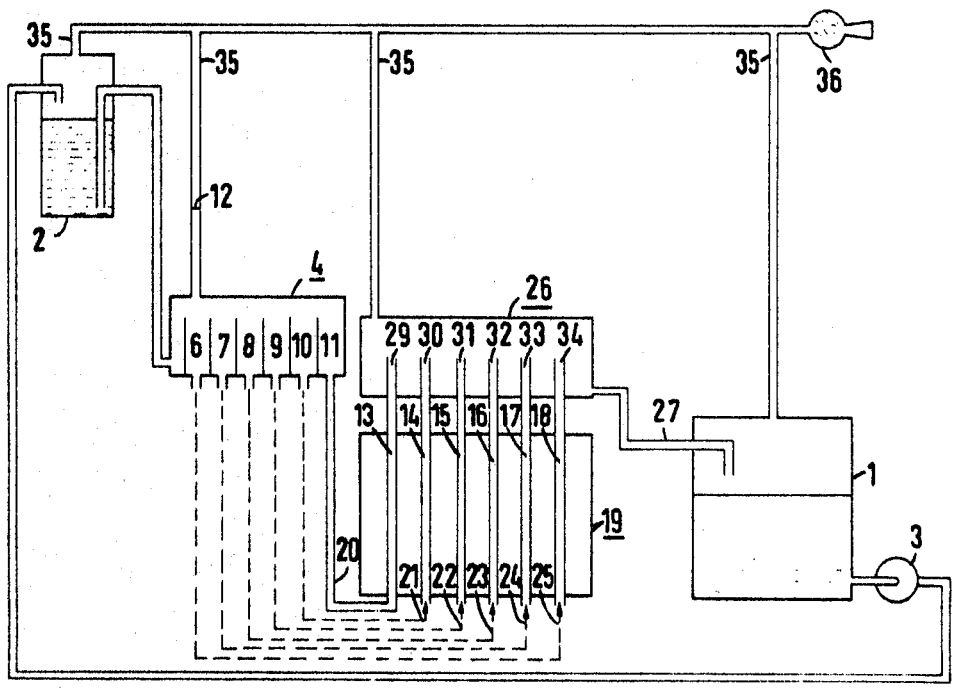
FIG. 1 is a circuit diagram of the system constituting the apparatus of our invention which is employed for carrying out the method of the invention.

Referring now to the drawing and first particularly to FIG. 1 thereof, there is shown an electrolyte supply vessel 1 from which electrolyte is either continually or discontinually, i.e. intermittently, pumped into a leveling tank 2. A pump 3 driven by a non-illustrated electric motor is employed for circulating the electrolyte through the illustrated circulatory path. The pump 3 is a gear pump, for example, and can be operated discontinually by means of a non-illustrated timer or time-regulating device. The leveling tank 2 is provided with a siphon whereby the discharge of electrolyte from the leveling tank 2 is effected only discontinually. The quantity of electrolyte flowing out of the leveling tank 2 through the siphon at the beginning of the circulating period thereof initially arrives in a distributor or manifold 4 from which it flows into the several electrolyte chambers of the individual fuel cells of battery 19.

Figure 1A:
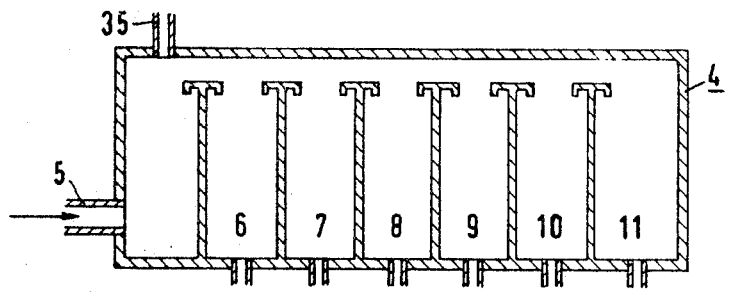
FIG. 1a is a longitudinal sectional view of the distributor or manifold forming part of the system of FIG. 1.

As shown in FIG. 1a, which is a longitudinal sectional view, considerably enlarged, of the distributor or manifold 4 shown diagrammatically in FIG. 1, the electrolyte flows through the duct 5 into the distributor or manifold 4 and fills the separation chambers 6 through 11 formed therein by the illustrated partitions. The quantity of electrolyte must be so adjusted that during the circulating phase thereof, the chambers 6 through 11 are connected to one another by the electrolyte, i.e. the electrolyte is in continuous communication over the upper edges of the partitions, the electrolyte being raised, for example, to the level 12 indicated in FIG. 1 in the standpipe 35. As the distributor 4 is being filled with electrolyte, the electrolyte simultaneously begins to flow out of the separation chambers respectively into the electrolyte chambers 13 through 18 of the respective individual fuel cells of the battery 19 through the respective tubes 20 through 25. The electrolyte thereby forced out of the electrolyte chambers 6 through 11 rises to a high level in the collector vessel 26 from which it can return through the discharge tube 27 to the supply vessel 1.

Figure 1B:
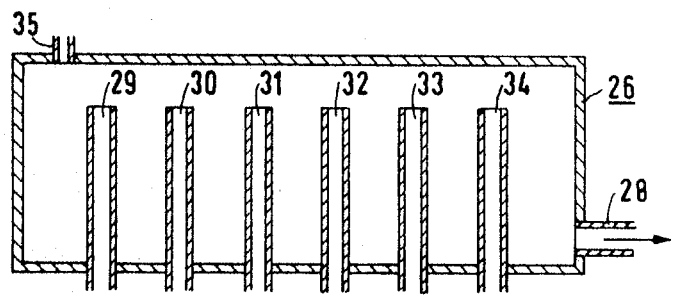
FIG. 1b is a longitudinal sectional view of a collector vessel forming part of the system of FIG. 1.

As shown more clearly in the longitudinal sectional view of FIG. 1b, the collector vessel 26 is provided with a discharge tube 27 and is connected through the tubes 29 through 34 with the individual fuel cells of the battery 19.

An important feature of the method of our invention is that during the electrolyte-circulating period, the distributor or manifold 4 and the collector vessel 26 are filled to such a level with electrolyte, i.e. to respective levels above the partitions of the chambers 6 to 11 and above the upper ends of the tubes 29 through 34, that all of the fuel cells of the battery 19 are connected to one another through electrolyte passages, i.e. there is continuous communication between the quantities of electrolyte in each of the respective fuel cells, and, after the culmination of the electrolyte circulating period, the communication or contiguity of the electrolyte is again interrupted at these passages or connections within the distributor 4 and the collector vessel 26.

In accordance with our invention, the foregoing action is obtained by the fact that, in arranging the distributor 4 and the collector vessel 26, a predetermined difference in the level thereof is maintained so that the tubes 29 through 34 in the collector vessel 26 are disposed at such a high level that the upper end openings thereof are located between the upper edge of the partitions separating the separation chambers 6 through 11 and the base of the distributor or manifold 4.

In order to prevent discharge of the electrolyte from the fuel cell battery, it is furthermore necessary that the open ends of the tubes 29 through 34 in the collector vessel 26 be located above the electrolyte chambers of the fuel cell battery and above the base of the distributor or manifold 4.

According to a preferred embodiment of the invention of the instant application, the difference in level between the distributor or manifold 4 and the collector vessel 26 is adjusted so that when the electrolyte is not circulating through the system, a remainder quantity of electrolyte is left in the separation chambers 6 through 11 of the distributor or manifold 4 and therewith the connecting tubes 20 though 25, which have a narrow cross section as compared to the relatively wide cross section of the separation chambers 6 through 11, are always filled with electrolyte. In this way, during the influx of the electrolyte at the beginning of the circulating period, the inclusion of gas bubbles in the tubes 20 to 25 is prevented. The inclusion of gas bubbles would increase the flow resistance in the respective tube, and would cause non-uniform flow in the individual fuel cells. The introduction of gas bubbles into the electrolyte chambers located between the electrodes of the individual fuel cells is also advantageously sought to be prevented because an increase in the inner resistance is thereby avoided.

The supply vessel 1, the leveling tank 2, the distributor or manifold 4, and the collector vessel 26 are connected with one another and with the atmosphere through an absorption vessel 36 for the purpose of equalizing the pressure through the ducts 35, such as standpipes for example, the filling of the absorption vessel 36 being adjusted respectively to the amount of electrolyte used. When potassium hydroxide is employed as electrolyte, the absorption vessel 36 is expediently filled with granular potassium hydroxide or sodium hydroxide-asbestos in order to prevent carbonization of the electrolyte solution.

In order to prevent leakage currents, it is moreover expedient to render hydrophobic the upper edges of the partitions separating the separation chambers 6 through 11 in the distributor or manifold 4 and the upper edge of the tubes 29 through 34 in the collector vessel 26, or to coat them with a sleeve or packing ring of hydrophobic material, for example a packing ring of tetrafluoroethylene, polyethylene or the like.

Materials which are suitable for use in making the distributor 4 and the collector vessel 26 are those which are resistant to the corrosive action of the electrolyte in the range of operating temperatures of the fuel-cell battery. When using n KOH as electrolyte, substances such as nickel, polymethylmethacrylate, polyethylene, glass and the like are suitable for use in making the distributor 4 and the collector vessel 26.

In the hereinafter described embodiment, short-circuit currents in batteries of the aforedescribed type can be periodically cut off with the aid of the method of our invention, so that the extent to which chemical energy is converted to electrical energy is thereby considerably increased.

In carrying out the method of our invention, it has surprisingly been found that not only are the short-circuit currents periodically removed, but also, in addition thereto, during the circulation phase of the electrolyte, a reduction in the concentration polarization in the gas diffusion electrodes is increased. After the circulation phase of the electrolyte was over, a respective increase in voltage at the electrodes was observed which again slowly decreased during the pauses or non-circulating periods between the circulation phases of the electrolyte. At the end of the non-circulating periods of the electrolyte, however, there remained a voltage increase relative to the equilibrium level.

The observed reduction of the concentration polarization is explained by the fact that during the circulation period of the electrolyte, the pressure within the electrolyte chambers of the battery increases, whereby the pressure difference between the gas and the electrolyte chamber is reduced and the three-phase boundary within the electrode pores are displaced in a direction toward the gas chambers. During this cycle, the reaction products formed and the inert gas cushion which has accumulated are removed from the active regions or vicinity of the electrodes. By the displacement of the three-phase boundary, the liquid films in the gas-filled portion of the pores are restored and the inert gas cushion is displaced or driven off by the sucking-in or absorption of the electrolyte from the electrodes. Differences in concentration in the electrolyte-filled portion of the pores are thereby equalized or balanced.

In the hereinafter described example, two ranges of no-load voltages of batteries having seventeen fuel cells respectively operated by hydrogen and oxygen, wherein the fuel cells were connected electrically in series and traversed by electrolyte in parallel, were compared to one another. Thus, a battery A according to FIG. 1 was discontinually circulated with electrolyte according to the invention, while a battery B was continually circulated with electrolyte in a conventianal manner. The battery A was circulated with two liters of 6 n KOH at room temperature respectively at intervals of 120 minutes, the duration of circulation being six minutes at a time.

Figure 2:
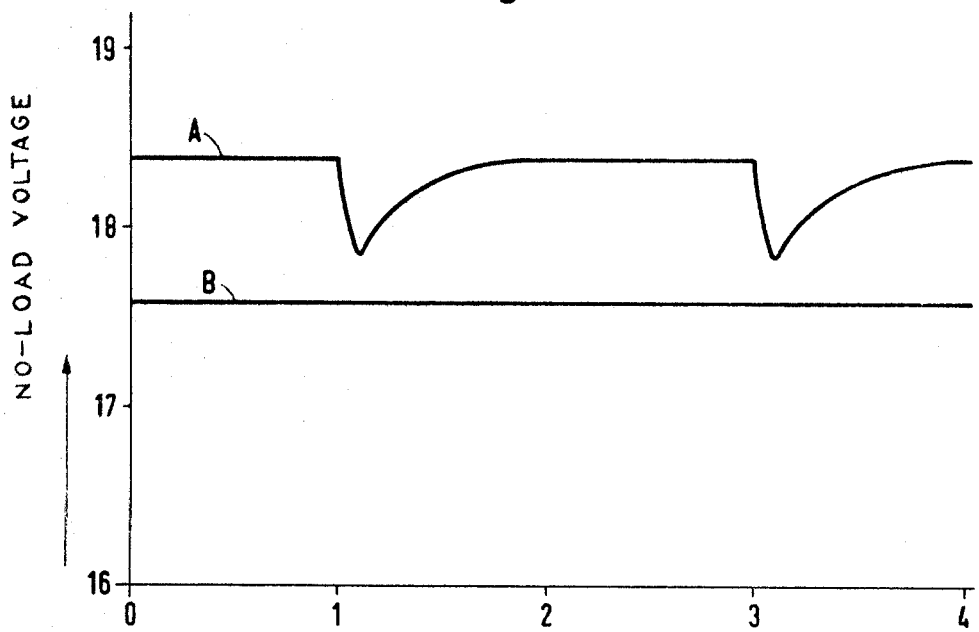
FIG. 2 is a diagram of the no-load voltage of a fuel-cell battery having interrupted electrolyte circulation and one having continuous electrolyte circulation plotted against testing time.

As can be seen in FIG. 2, at the beginning of the test, the no-load voltage of the battery A was 0.8 volt higher than the no-load voltage of the battery B. The maximum voltage of 18.4 volts attained by the battery A corresponds to 1.082 volts per fuel cell, a value substantially attained by individual fuel cells, and thereby leads to the inference that the electrolyte short-circuit currents were completely eliminated. During the circulation of the electrolyte, due to the thereby produced electrolyte connections or continuous communication in the distributor 4 and collector vessel 26, the no-load voltage of battery A respectively dropped to 17.84 volts and, after the end of the circulating phase, it again increased to the original value of 18.4 volts. In the battery B which was continually circulated with electrolyte, there was produced, on the other hand, a constant voltage of 17.6 volts.

The foregoing tests served only to demonstrate that the short-circuit currents in the apparatus of the invention are actually eliminated or cut off. The voltage deviations or variations at the beginning of the circulation phase of the electrolyte in a battery subject to load are smaller for current densities plotted in actual practice, due to the small slope of the current-voltage curve.

The principle of our invention is obviously limited to fuel cells having moving or conducted electrolytes, such as aqueous alkaline or acidic solutions for example. It is, however, not limited to gas diffusion electrodes but also encompasses active two-phase electrodes with which one or more reactants are provided in the electrolyte. In such a case, the electrolyte-reactant mixture is circulated with the aid of the aforedescribed system or apparatus. In general, due to the limited selectivity of the catalysts, either the fuel or the oxidant are contained in the electrolyte.

It must furthermore be mentioned with respect to the method of our invention, that accumulated gas bubbles are removed by the periodic electrolyte circulation in the electrolyte chamber. An accumulation of gas bubbles can be caused by supersaturation and porosity or lack of gastightness, whereby the inner electrical resistance is respectively increased.

The method of our invention is particularly suitable for such fuel cell batteries which are to be operated for relatively long periods of time with relatively small to middle range current strengths, because in such fuel cells, the ratio of short-circuit current to nominal current, without suitable measures being taken, is especially high. With these fuel cells, no great demands are made with respect to the electrolyte circulation, because there is no problem in removing waste heat from the cells, and one can generally ignore the concentration of the reaction products.

The aforedescribed discontinual electrolyte circulation is well suited also for emergency current-generating systems because, during the idling period, i.e. the period in which no circulation of the electrolyte takes place, the ratio of short-circuit current to nominal current is infinitely great. Since, on the other hand, when employing the method of the invention, negligible changes in the electrolyte concentration occur in the idling periods only due to the reaction of diffusing gases, relatively long intervals of time can be permitted to elapse between the individual circulation periods.

We claim:

1. Method of interrupting short-circuit current in batteries formed of at least two fuel cells electrically connected in series and having electrolyte flow paths connected in parallel which comprises pumping electrolyte from a supply vessel to a leveling tank, conducting the electrolyte discontinually from the leveling tank to a distributor having a plurality of chambers connected respectively with electrolyte chambers in each of the fuel cells of a battery and returning the electrolyte through a collector vessel to the supply vessel after the electrolyte has traversed the electrolyte chambers of the battery, the electrolyte during the conducting period thereof being in continuous communication in the distributor and in the collector vessel between the individual fuel cells of the battery, the electrolyte during the non-conducting periods thereof being separated into discontinuous quantities due to discharge of electrolyte from the collector vessel into the supply vessel.

2. Method of claim 1, wherein the electrolyte is pumped continually from the supply vessel to the leveling tank.

3. Method of claim 1, wherein the electrolyte is pumped discontinually from the supply vessel to the leveling tank.

4. Method of claim 1, wherein the collector vessel is located above the battery, and the electrolyte is conducted in an upward direction from the electrolyte chambers of the respective fuel cells to the collector vessel.

5. Apparatus for interrupting short-circuit current in batteries formed of at least two fuel cells electrically connected in series and having electrolyte flow paths connected in parallel comprising electrolyte supply means, a leveling tank communicating with said supply means, pump means for pumping electrolyte from said supply means to said leveling tank, distributor means having a plurality of chambers respectively connected to electrolyte chambers in each of the fuel cells of a battery, means for discontinually conducting electrolyte from said leveling tank to said distributor means and a collector vessel connected between the electrolyte chambers of said fuel cells and said supply means, said distributor means and said collector vessel being so disposed relative to one another and to the electrolyte chambers of the fuel cells that the electrolyte is in continuous communication in the distributor and in the collector vessel between the individual fuel cells of the battery in the phase wherein the electrolyte is being conducted and is separated into discontinuous quantities, due to discharge of electrolyte from said collector means into said supply vessel, in the phase wherein the electrolyte is not being conducted.

6. Apparatus according to claim 5, including means for operating said pump means continually.

7. Apparatus according to claim 5, including means for operating said pump means discontinually.

8. Apparatus according to claim 5, wherein said collector vessel is located above the fuel cells of the battery.

9. Apparatus according to claim 5, wherein said distributor means has at least one partition separating said chambers thereof, and including a plurality of ducts respectively interconnecting each of said distributor chambers with a respective fuel cell of the battery, each of said chambers having an opening for passage of electrolyte and discharge of gas therefrom.

10. Apparatus according to claim 5, wherein said collector vessel is connected to a plurality of electrolyte supply tubes extending from the electrolyte chambers of the fuel cells partly into said collector vessel and to at least one tube for discharging electrolyte and gas therefrom, said discharge tube being located below the open end of said supply tubes.

11. Apparatus according to claim 5, wherein said chambers of said distributor means are separated by at least one partition having an upper edge spaced from the top of said distributor means, and said collector vessel is connected to a plurality of electrolyte supply tubes extending from the electrolyte chambers of the fuel cells partly into said collector vessel, said supply tubes having openings within said distributor means located between said upper edge of said partitions and the base of said distributor means.

12. Apparatus according to claim 5, wherein said collector vessel is connected to a plurality of electrolyte supply tubes extending from the electrolyte chambers of the fuel cells partly into said collector vessel, the end openings of said supply tubes within said collector vessel being located above the electrolyte chambers in the battery.

13. Apparatus according to claim 5, wherein said chambers of said distributor means are separated by at least one partition having an upper edge, spaced from the top of said distributor means, said upper edge being of hydrophobic material.

14. Apparatus according to claim 5, wherein said chambers of said distributor means are separated by at least one partition having an upper edge spaced from the top of said distributor means, said edge being covered by a collar consisting of hydrophobic material.

15. Apparatus according to claim 14, wherein the hydrophobic material is selected from the group of materials consisting of tetrafluoroethylene and polyethylene.

16. Apparatus according to claim 5 including a plurality of electrolyte supply tubes extending from the electrolyte chambers of the fuel cells partly into said collector vessel, said supply tubes having an upper open end consisting of hydrophobic material.

17. Apparatus according to claim 5 including a plurality of electrolyte supply tubes extending from the electrolyte chambers of the fuel cells partly into said collector vessel, said supply tubes having an upper open end, and collars carried by said upper ends of said supply tubes and consisting of hydrophobic material.

18. Apparatus according to claim 5 including a siphon communicating with said leveling tank.

19. Apparatus according to claim 5 including ducts connecting supply vessel, said leveling tank, said distributor means and said collector vessel to one another so as to equalize the pressure therein.

References Cited

UNITED STATES PATENTS

| | | | |
|---|---|---|---|
| 852,464 | 5/1907 | Sokal | 136—160 |
| 2,921,111 | 1/1960 | Crowley et al. | 136—160 X |
| 3,457,114 | 7/1969 | Wedin | 136—86 |

FOREIGN PATENTS 1,047,936  11/1966  Great Britain.

ALLEN B. CURTIS, Primary Examiner

U.S. Cl. X.R.

136—160